May 20, 1958 T. B. HALL 2,835,496
COLLET CONSTRUCTION
Filed March 29, 1955
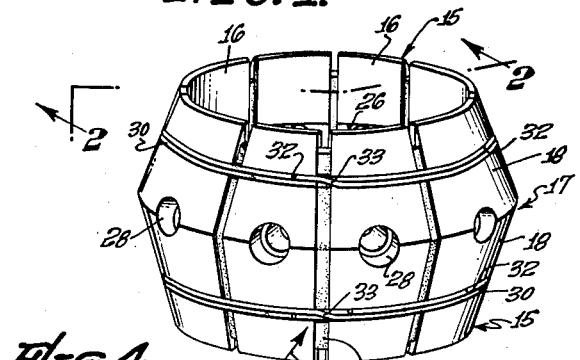
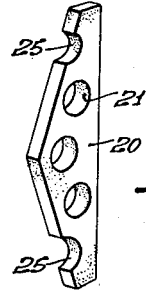
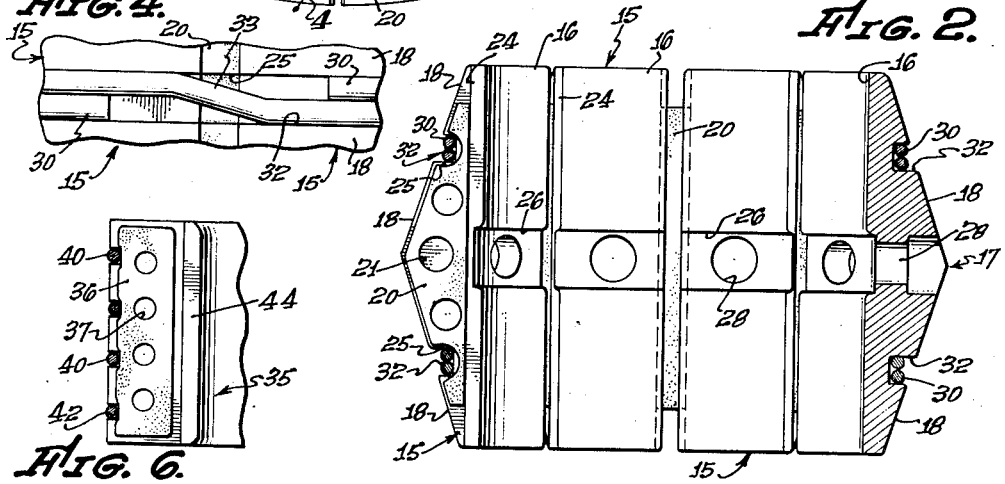
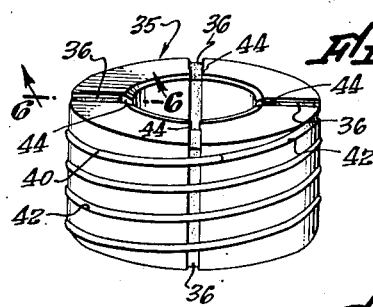
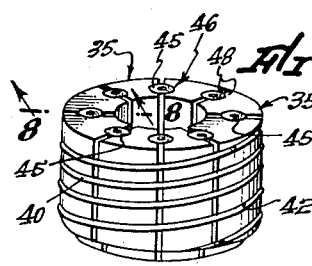
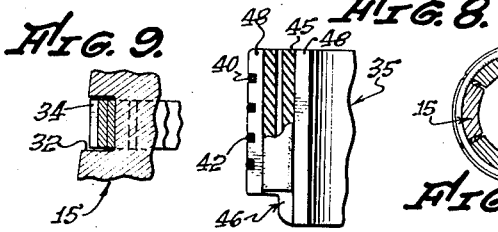
TELLER B. HALL,
INVENTOR.
BY HIS ATTORNEYS.
HARRIS, KIECH, FOSTER & HARRIS.

United States Patent Office 2,835,496
Patented May 20, 1958

2,835,496

COLLET CONSTRUCTION

Teller B. Hall, Los Angeles, Calif.

Application March 29, 1955, Serial No. 497,700

4 Claims. (Cl. 279—1)

This invention relates to collets to be employed in lathes and similar machines for holding appropriate machine tools or work.

A particular object of the invention is to provide novel, efficient and relatively simple holding means providing for a limited amount of expansion under relatively heavy compression for the reception of tools of somewhat different sizes, or of work to be machined of somewhat different sizes, so that a limited number of such collets may be employed for a great variety of sizes of tools or bars to be machined or the like, such work having its outer end centered by such conventional positioning means as may be required.

A further object of the invention is to provide for collet structures of the general nature indicated which may be built with tapered or cylindrical or other exteriors as may be required.

A still further object of the invention is to provide for collet constructions produced from a plurality of separate or separable segments which are readily retained in separable and yielding relationships, which may be easily assembled or disassembled, and are readily positionable in appropriate chucks for clamping therein to hold in bound relation such work or tools as desired and appropriate to be received therein, the collet segments being diametrically contracted or expanded as conditions demand.

More particularly the object of the invention is to provide a collet structure wherein separable segments are yieldably assembled and retained through the medium of spaced expansible spring means wrapped therearound in plural turns, or extending continuously around the collet, and exposed at both ends of the collet structure, a further object in this connection being to provide compressible spacing means between the collet segments providing for at least a limited amount of expansion and contraction without interfering with the functioning of the inner and outer collet surfaces. Additionally it is an object of the invention to provide for the imbedding of spaced yieldable spring means in grooves in the outer faces of the collet segments whereby to retain the collet segments in operative assemblage and under considerable compressive force without projection of such spring means beyond the respective collet surfaces.

Other objects of the invention and various features of construction thereof will be apparent to those skilled in the art upon reference to the following specification and the accompanying drawing wherein certain embodiments of this improvement are illustrated.

In the drawing:

Fig. 1 is a perspective view of one form of collet construction in accordance with the present invention;

Fig. 2 is a vertical section as indicated by the line 2—2 of Fig. 1;

Fig. 3 is a perspective view of a perforated compressible rubber spacer to be used between adjacent segments of the collet of Figs. 1 and 2;

Fig. 4 is an elevational detail on a much enlarged scale showing the overlapping relationship between the ends and the middle portion of each of the spring means wrapped about the assemblage of Fig. 1, the position being that indicated by the arrow 4 of Fig. 1;

Fig. 5 is a perspective view of a modified form of collet also constructed in accordance with this invention;

Fig. 6 is a vertical sectional detail taken on the line 6—6 of Fig. 5;

Fig. 7 is a perspective view of a further modified form;

Fig. 8 is a vertical section taken on the line 8—8 of Fig. 7;

Fig. 9 is a sectional detail on an enlarged scale illustrating a modification in the form of an overlapped or spiral flat spring band which may be employed for some purposes in lieu of the coil spring band means of the other forms; and Fig. 10 is a sectional view showing a continuous rubber ring around an assemblage of collet segments.

In all forms of the invention illustrated a plurality of somewhat elongated arcuate segments is employed, these segments being shaped for use with respective chucks being employed and for use with particular types of work being handled. In Fig. 1 the collet there illustrated comprises a series of rigid segments 15, normally formed of appropriate steel, the curvature of the inner faces 16 of such segments being such as to form the work-receiving opening having the necessary diameter for the work involved. In this particular form of collet, the vertical face of each segment wall opposed to the wall of the adjoining segment is double tapered, that is, it tapers from its middle portion both upward and downward as best seen in Fig. 2, thereby providing a maximum outer diameter indicated at 17 in Fig. 1 and lying between the upper and lower inclined face portions 18.

Desirably, a compressible rubber spacer 20 is disposed between opposing faces of adjacent segments 15, each of these spacers being provided with a plurality of holes 21 providing for shift or flow of the rubber to permit compression when the segments 15 are in their contracted positions. Also, the lateral dimensions of the spacers 20 are somewhat less than the corresponding face dimensions of the side walls of the segments 15, so that corresponding outward flow or shift of the rubber when these spacers are placed under compression will not cause the rubber to extend beyond the external faces 18 of the segments or the internal faces 16 thereof. In addition, in order to position the inner edges of the spacers 20 so that they cannot travel to or beyond the inner faces 16, corresponding inner vertical edges of opposing walls of the segments 15 are provided with inwardly directed longitudinally extending shoulders 24 against which corresponding corner portions of the edges of the spacers 20 abut, thereby being held against shift beyond said shoulders 24. Such shoulders 24 may be provided on either or both of two opposed faces of the segments 15. Additionally, the outer edges of upper and lower portions of the spacers 20 are notched at 25 to receive spring means, presently to be described, which retain the segments 15 in assembled relation. In addition to shaping the segments 15 externally as indicated at 17 and 18, in order to accommodate whatever type of chuck is to be used the inner faces 16 of the segments may be formed as may be necessary for any particular use. For example, the inner faces 16 may be provided with grooves 26 aligned with each other, and with holes 28 extending entirely through central portions of the segments, to receive screws for holding the well known collet pads or reducers.

An extremely important feature of this invention is the means by which the separable segments 15 are held in the assembled relation seen in Figs. 1 and 2. These means in the form illustrated in Figs. 1, 2 and 4 have the form of coiled spring wires 30 each of which is to be in the form of more than one convolution at the opposite ends of the collet. These convolutions of wire 30 are received in peripheral grooves 32 of uniform width in the upper and lower ends of the segments 15, the grooves of adjacent sections being aligned so that plural helical convolutions of the spring wire 30 fit into such grooves 32. In the form illustrated in these figures two convolutions of spring wire 30 are employed and the widths of the grooves 32 are such as to neatly receive these two convolutions side by side in the relationship illustrated. In practice heavy piano wire has been used for the coil spring wire 30 and the set of such spring wire is such as to draw the segments 15 rather closely together and appreciably compress the rubber spacers 20. Such spacers may, of course, instead of being an appropriately soft rubber, be other appropriate compressible or resilient material in sheet form or strip form.

In the particular form of Figs. 1 and 2 the wire coils are constructed as illustrated in Fig. 4 where the middle portion 33 is offset whereby to provide a corresponding space or pocket at each side thereof to receive the adjacent free end portion of the wire 30.

By reason of the yieldability of the rubber spacers 20 and the spring wire 30, the segments 15 may be appreciably expanded, or compressed, as may be necessary, whereby to accommodate appreciably different sizes of work to be handled, thereby materially reducing the number of collets which would otherwise be necessary for any lathe or other machine capable of handling a large variety of sizes of work or tools.

As seen in Fig. 9, instead of using spring wire coils 30 as in Figs. 1, 2 and 4, a flat spring band whose turns overlap may be used, such band 34 being to the indicated extent spiral, its width, however, approximating the width of the respective groove 32.

Figs. 5 and 6 illustrate a somewhat simplified form of collet employing differently shaped segments 35 than the segments 15. Here rubber spacers 36, corresponding generally to the rubber spacers 20, except for shape, and having holes 37 similar to the holes 21, are employed between the segments 35. Instead of using coils like the spring coils 30 of Figs. 1, 2 and 4, a helical band or wire spring 40 is desirably used, this spring 40 being countersunk in aligned helical groove sections 42 in the outer faces of the segments 35, somewhat after the fashion of the structure of the other form. Here again, as best seen in Fig. 6, the spacers 36 are smaller in lateral dimensions than the corresponding opposed faces of the segments 35. Also, inward creeping of the inner edges of these spacers 36 is prevented by upstanding shoulders 44 at the inner edges of the segments and corresponding with the shoulders 24 of the segments 15 of the other form. Outward creeping of these spacers 36 is of course prevented by the convolutions of the helical wire spring 40.

A somewhat similar situation is illustrated in Figs. 7 and 8 wherein the same segments 35 and helical wire spring 40 are received in helical groove sections 42 provided by corresponding aligned portions of the groove in the segments 35 as indicated. In this form, however, instead of using the flattened rubber spacers 36, sections of rubber tube 45 are employed, the central passage through the tube providing for necessary compression. The opposing faces of the spacers 45 are in this form received in vertically extending arcuate or approximately semicylindrical channels 46 which in themselves provide shoulders 48 both at the inner edges and the outer edges of the respective faces of the segments 35 whereby to prevent shift laterally of any significant proportion of the rubber tube lengths 45.

As shown in Fig. 10, it is possible to use powerful endless or continuous resilient rings, such as natural rubber or neoprene rings 50, in the grooves 32 to assemble the collet sections or segments 15 and exert the contractive influence provided by the spring rings 30 or similar plural convolution springs.

As is apparent from the foregoing, each collet of this invention is capable of handling work of a great variety of size variations, as a consequence of which a relatively small number of collets will handle most sizes encountered in the shop. This is true because the respective collet is compressible to accommodate many more sizes than the conventional steel spring collet. The relatively very powerful springs of a plurality of convolutions engaged about both end portions of each collet, and middle portions also, if desired, in the helical type, as well as the endless rings, assure permanence of the collet assemblages both before and after mounting of work or tools therein.

I claim as my invention:

1. In a collet structure, the combination of: a plurality of similar separable rigid collet segments arranged in a circular series to receive work within the assemblage, each of said segments having plural external annularly disposed grooves; expansible spring means providing plural peripheral convolutions each of which is wrapped peripherally about the assembled segments and disposed in said grooves and normally retaining said segments in collapsed relation, the inner annular wall of the assembled structure being adapted to engage said work and the outer annular wall being adapted to be engaged and held by mounting means therefor; and a plurality of resilient expansible compressible flat spacers between opposed faces of the assembled segments, said spacers being separate spacers each of which is provided with spaces for expansion of the spacers upon compression thereof.

2. A structure as in claim 1 wherein said spacers are separate rubber strips narrow enough to remain within the outlines of said inner and outer walls upon compression.

3. In combination in a collet: a plurality of similar separate segments arranged in a circular series and providing within them a passage for receiving work, the inner faces of the segments providing work-gripping faces, side faces of adjacent segments opposing each other; separable compressible spacer strips of resilient material disposed between pairs of such opposing faces and being narrower than the respective segment faces, at least one opposing face of each of such pairs having stop means at its inner edge to limit inward movement of the inner edge of the corresponding spacer strip upon compression, said strips being of rubber and having openings therein to accommodate rubber shift on compression; and elongated spring means wrapped around said circular series of segments and binding them together in spacer-strip compressing condition, said spring means being countersunk in aligning grooves in external faces of said segments and limiting outward movement of the outer edges of said spacer strips.

4. A combination as in claim 3 wherein said rubber strips are flat.

References Cited in the file of this patent

UNITED STATES PATENTS

| | | |
|---|---|---|
| 1,119,827 | Jacobson | Dec. 8, 1914 |
| 2,346,706 | Stoner | Apr. 18, 1944 |
| 2,403,136 | Stoner | July 2, 1946 |
| 2,601,419 | Spahn | June 24, 1952 |
| 2,631,872 | Wurmser | Mar. 17, 1953 |